United States Patent [19]
Aron

[11] Patent Number: 5,862,659
[45] Date of Patent: Jan. 26, 1999

[54] HAYMAKING MACHINE WITH AT LEAST ONE WINDROWING ROTOR

[75] Inventor: Jérôme Aron, Dossenheim-sur-Zinsel, France

[73] Assignee: Kuhn S.A., Saverne Cedex, France

[21] Appl. No.: 744,460

[22] Filed: Nov. 7, 1996

[30] Foreign Application Priority Data

Nov. 7, 1995 [FR] France ................................ 95 13297

[51] Int. Cl.$^6$ ................................................ A01D 78/12
[52] U.S. Cl. .............................. 56/367; 56/377; 56/396; 56/384
[58] Field of Search ............................. 56/367, 377, 380, 56/384, 396, 397, 398, 372, 374, 370

[56] References Cited

U.S. PATENT DOCUMENTS

| | | | |
|---|---|---|---|
| 3,650,101 | 3/1972 | Aron | 56/370 |
| 4,144,699 | 3/1979 | Aron | 56/370 |
| 4,149,364 | 4/1979 | Aron | 56/366 |
| 4,628,673 | 12/1986 | Aron | 56/370 |
| 4,656,821 | 4/1987 | Aron | 56/370 |
| 4,693,065 | 9/1987 | Aron et al. | 56/377 |
| 4,723,404 | 2/1988 | Aron | 56/370 |
| 4,875,332 | 10/1989 | Aron | 56/377 |
| 4,914,901 | 4/1990 | Aron | 56/370 |
| 4,922,700 | 5/1990 | Aron | 56/370 |
| 4,953,346 | 9/1990 | Aron | 56/11.1 |
| 5,024,053 | 6/1991 | Aron | 56/367 |
| 5,060,465 | 10/1991 | Aron | 56/367 |
| 5,274,990 | 1/1994 | Aron et al. | 56/377 |
| 5,548,949 | 8/1996 | Gantzer | 56/367 |

FOREIGN PATENT DOCUMENTS

| | | |
|---|---|---|
| 0 390 713 | 10/1990 | European Pat. Off. . |
| 0 415 301 | 3/1991 | European Pat. Off. . |
| 0 614 604 | 9/1994 | European Pat. Off. . |
| 0 642 733 | 3/1995 | European Pat. Off. . |
| 2 707 450 | 1/1995 | France . |
| 28 33 814 | 2/1980 | Germany . |
| 40 27 025 | 3/1991 | Germany . |
| 40 33 526 | 5/1991 | Germany . |
| 92 11 824.0 | 12/1992 | Germany . |
| 6406679 | 12/1964 | Netherlands . |
| 89 08380 | 9/1989 | WIPO . |

*Primary Examiner*—Heather Shackelford
*Attorney, Agent, or Firm*—Oblon, Spivak, McClelland, Maier & Neustadt, P.C.

[57] ABSTRACT

A haymaking machine including at least one windrowing rotor which is articulated to a bearing structure in such a manner that it can pivot about at least one axis which is substantially horizontal and perpendicular to the direction of travel. The at least one rotor can be driven in rotation about a central spindle which is substantially vertical and which is fitted at its lower end with a support equipped with several bearing wheels at least one of which is situated behind the central spindle. The bearing wheel which is situated behind the central spindle of the rotor is connected to an arm of the support which includes a mechanism pressing the bearing wheel against the ground during windrowing work in such a way that it is constantly bearing against the ground and tends to cause the rotor to pivot downward on its front half about the articulation to the bearing structure.

9 Claims, 4 Drawing Sheets

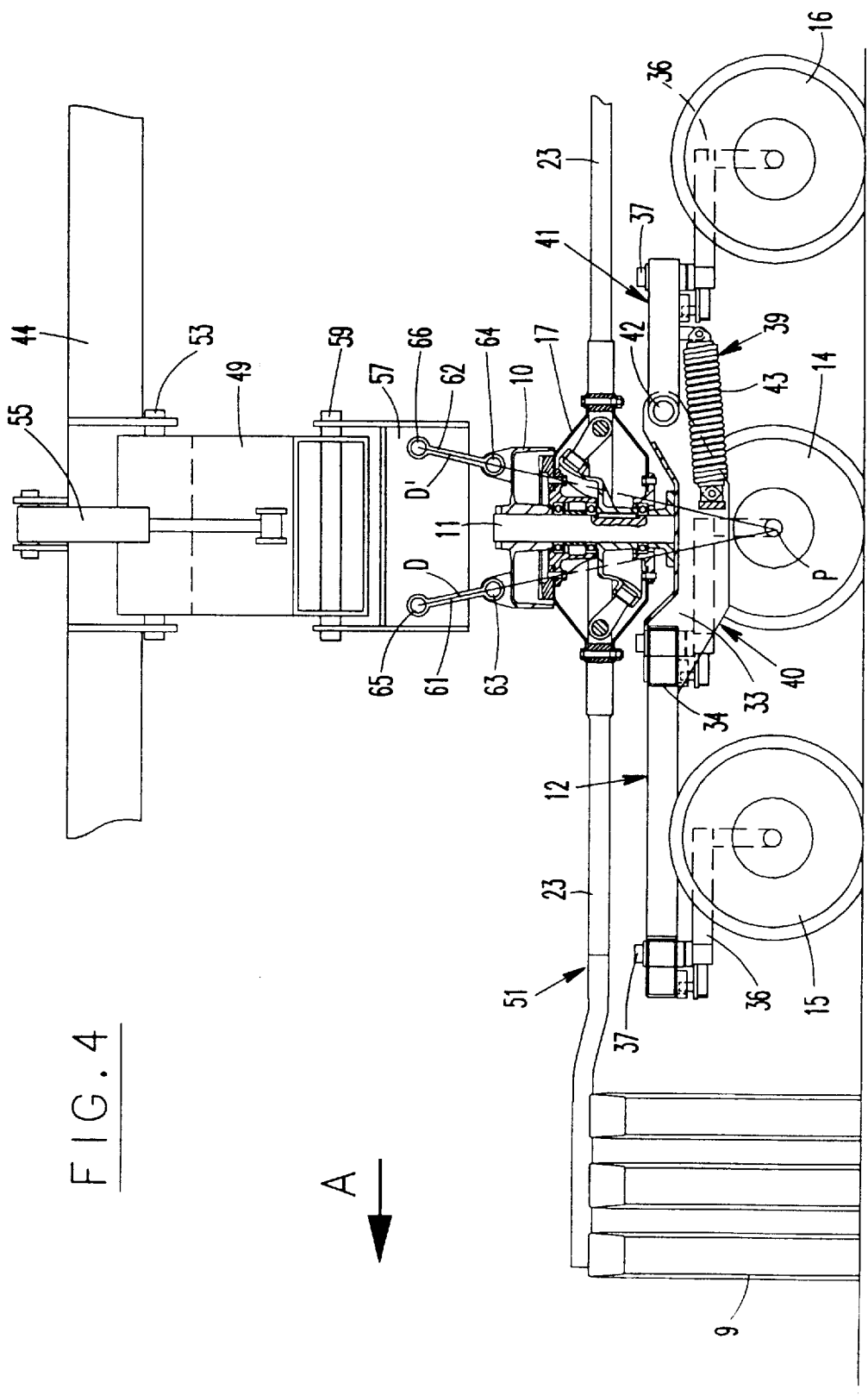

HAYMAKING MACHINE WITH AT LEAST ONE WINDROWING ROTOR

BACKGROUND OF THE INVENTION

1. Field of the Invention

The present invention relates to a haymaking machine including especially a bearing structure which can be connected to a tractor, at least one rotor with windrowing tools which is articulated to the bearing structure so as to be able to pivot about at least one axis which is substantially horizontal and perpendicular to the direction of travel, it being possible for said rotor to be driven in rotation about a central spindle which is substantially vertical and which is fitted at its lower end with a support equipped with several bearing wheels arranged close to the windrowing tools and at least one of which is situated, seen in the direction of travel, behind the central spindle.

2. Discussion of the Background

A machine of this kind is known in patent application DE-2 833 814. Such a machine carries out correct windrowing work when the land over which it is progressing is quite flat. By contrast, when the land has, as is generally the case, unevennesses in its surface, the bearing wheels lift the rotor as they pass over these unevennesses. The windrowing tools of said rotor then clear the ground and take a certain amount of time to return to the initial work position. They do not therefore rake up all of the fodder lying on the ground, and this leads to losses.

SUMMARY OF THE INVENTION

The object of the present invention is to provide a machine which no longer has the aforementioned drawbacks. It should especially allow the rotor or rotors, which are articulated with respect to their bearing structure, better to adapt to the relief of the land, using simple means.

To this end, an important feature of the invention consists in the fact that the bearing wheel which is situated behind the central spindle of the rotor is connected to a support arm which includes a means pressing said bearing wheel against the ground during work, in such a way that it is constantly bearing on the ground and tends to make the rotor pivot downward on its front half, about the articulation to the bearing structure. The bearing wheel which is situated behind the central spindle of the rotor thus stabilizes the rotor. In addition, as it tends to cause the front half of the rotor to pivot downward, about the articulation to the bearing structure, it presses the other bearing wheels on the ground. The windrowing tools of the rotor are then kept close to the ground in the region where they are raking the fodder, which prevents them from skipping over the fodder from time to time and leaving it spread out on the ground.

Said means for pressing down the bearing wheel is simple and inexpensive. The support arm of this bearing wheel may be made in two parts which are articulated together by means of an axis which is substantially horizontal and substantially perpendicular to the direction of travel. A drawspring may be hooked to said two parts in such a way that it pulls the second part with the bearing wheel toward the ground.

BRIEF DESCRIPTION OF THE DRAWINGS

Other features and advantages of the invention will be apparent from the claims and from the description hereafter of nonlimiting embodiments of the invention, with references to the appended drawings in which:

FIG. 4 represents a view from the side of one of the rotors of the machine according to FIG. 3.

DESCRIPTION OF THE PREFERRED EMBODIMENTS

Figure 1:
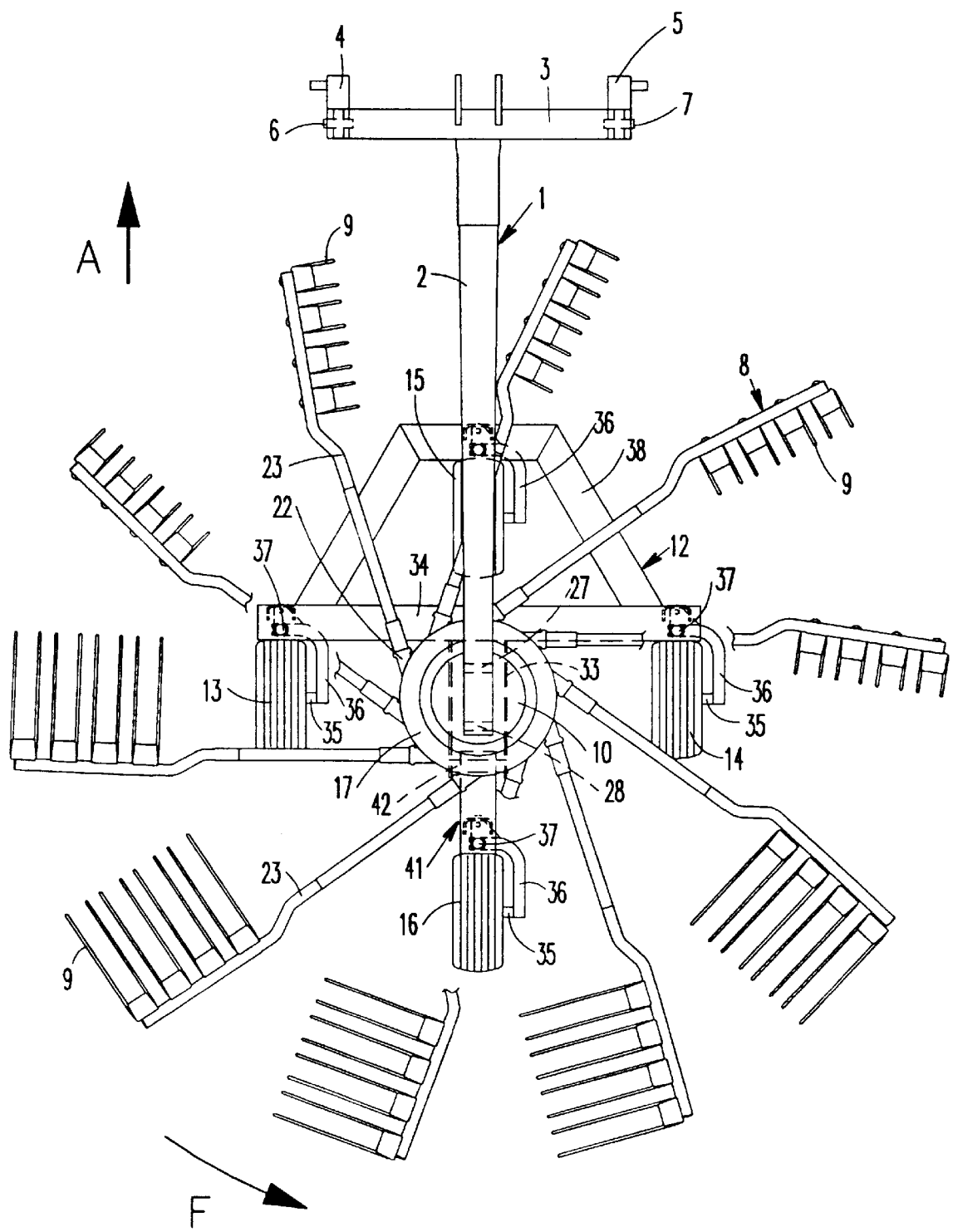
FIG. 1 represents a view from above of a machine according to the invention.
Figure 2:
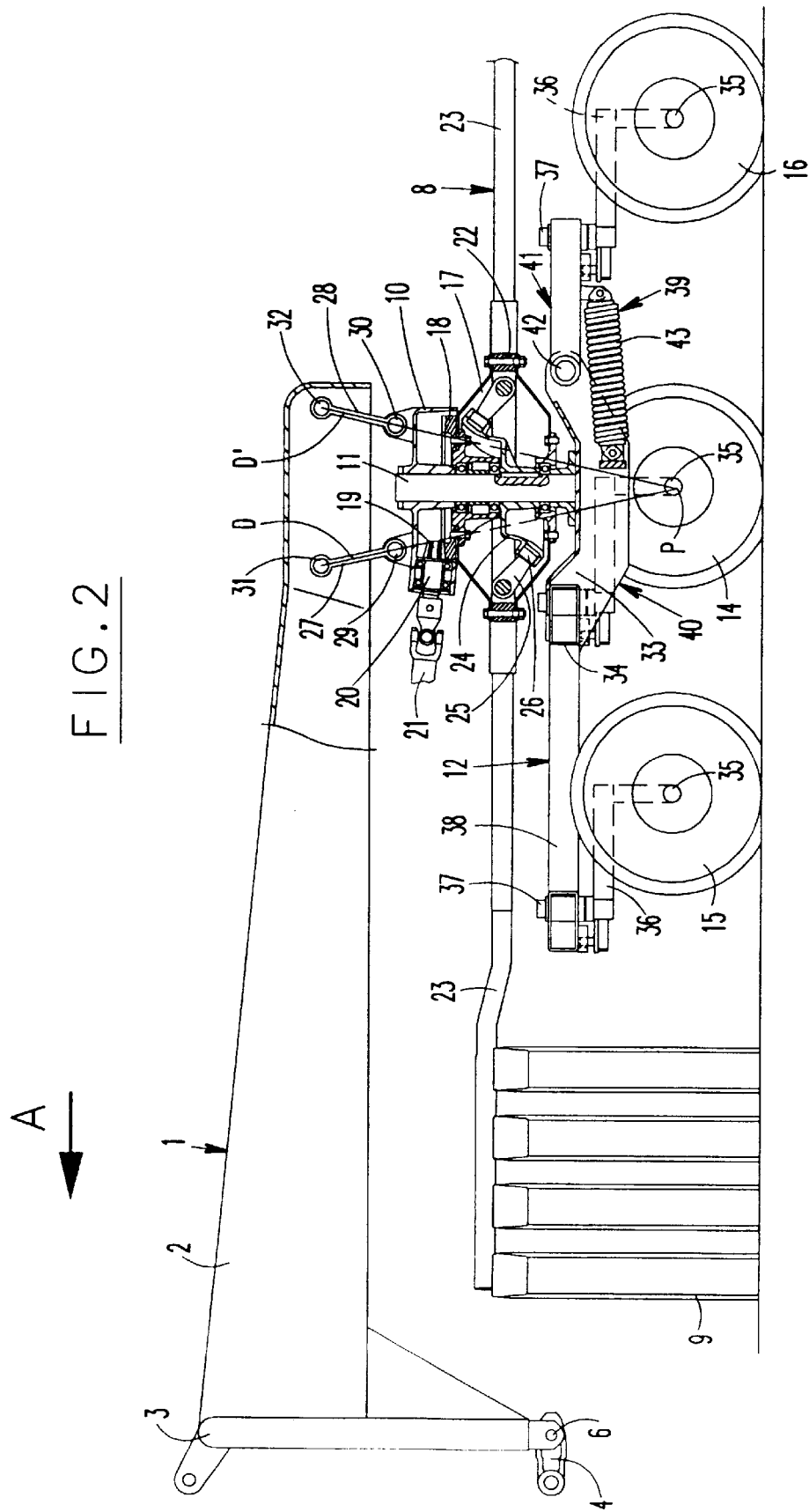
FIG. 2 represents a view from the side, with partial section, of this machine.

As represented in FIGS. 1 and 2, the windrowing machine according to the invention includes a bearing structure 1. This consists of a beam 2 which at its front end carries a three-point coupling device 3 for hitching to a driving tractor allowing it to be moved in a direction of travel A. The two lower coupling points consist of pivots 4 and 5 which are articulated to the device 3 via axes 6 and 7 which are substantially horizontal and perpendicular to the direction of travel A.

The other end of the beam 2 carries a rotor 8 with tools 9 intended to windrow products, such as grass or mown straw, lying on the ground. This rotor 8 has a casing 10 which is articulated to the beam 2 in a way which will be described later. Housed in this casing 10 is a substantially vertical central spindle 11. This spindle 11 extends downward and at its lower end carries a support 12 equipped with four bearing wheels 13 to 16 situated beneath the rotor 8. Arranged on that part of the spindle 11 which lies between the casing 10 and the support 12 is a housing 17. It is mounted on the central spindle 11 in such a way that it can rotate thereon. The upper side of the housing 17 is fitted with a toothed ring 18 which is situated in the volume inside the casing 10. It meshes with a drive pinion 19 which is also located inside the casing 10. This pinion 19 is secured to a shaft 20 which extends out of this casing 10 and may be connected to a power take-off of the tractor, by means of a PTO shaft 21.

The housing 17 is fitted with bearings 22 through which arms 23 pass. These extend in the form of spokes and at their outer ends carry the windrowing tools 9 which consist of forks. They are housed in said bearings 22 so that they can turn on themselves. Mounted on that part of the spindle 11 which is situated inside the housing 17 is a stationary cam 24 intended to control the tool-carrying arms 23 during windrowing work. For that, each of these arms 23 at its end extending inside the housing 17 has a lever 25 with a roller 26 which is guided in a groove of the cam 24.

The rotor 8 is articulated to the beam 2 via two levers 27 and 28 which are arranged one behind the other. Each of these two levers 27 and 28 is articulated at one of its ends to the casing 10 of the rotor 8 by means of an axis 29, 30 which is substantially horizontal and substantially perpendicular to the direction of travel A and at the other of its ends to the beam 2 by means of an axis 31, 32 which is also substantially horizontal and substantially perpendicular to the direction of travel A. The two axes 31 and 32 about which the two levers 27 and 28 are articulated to the beam 2 are further apart than the two axes 29, 30 about which they are articulated to the casing 10. In this way, these levers 27 and 28 converge downward. Straight lines D and D' passing through the two articulation axes 29, 31 and 30, 32 of each lever 27, 28 meet at a point P situated between the bearing wheels 13 to 16. Its distance from the ground may be more or less equal to half the height of said bearing wheels 13 to 16. Passing through this point P is an imaginary axis of pivoting of the rotor 8 with respect to the beam 2 of the bearing structure 1. This imaginary axis of pivoting is substantially parallel to the articulation axes 29 to 32.

The support 12 of the bearing wheels 13 to 16 has an arm 33 which points in the direction of travel A and which is fixed to the central spindle 11. This arm 33 is fitted at its end situated in front of said central spindle 11 with a crossmember 34. This carries two bearing wheels 13 and 14, one of which is situated to the left and the other to the right of the central spindle 11. Each of these bearing wheels 13 and 14 is mounted on a stub axle 35 which is secured to a crank lever 36. Each crank lever 36 is articulated to the crossmember 34 by means of a substantially vertical axis 37 which is situated further forward than the corresponding bearing wheel 13, 14. On its front side the crossmember 34 carries a bow 38 fitted with a third bearing wheel 15. This is situated in front of the central spindle 11 of the rotor 8. It is also mounted on a stub axle 35 which is secured to a crank lever 36, which lever is articulated to the bow 38 by means of a substantially vertical axis 37 situated further forward than the wheel 15 itself. The arm 33 carries a fourth bearing wheel 16 which is situated behind the central spindle 11. Like the other wheels 13, 14 and 15 it is mounted on a stub axle 35 which is secured to a crank lever 36. This crank lever 36 is articulated to the arm 33 by means of a substantially vertical axis 37 which is situated further forward than the bearing wheel 16. The four bearing wheels 13 to 16 can pivot about the vertical axes 37 of their respective levers 36. The angles of pivoting may be limited by means of stops. In this way, these wheels 13 to 16 can orientate themselves during turns. Furthermore, thanks to their arrangement with respect to the central spindle 11, they can be close to the windrowing tools 9 to make them follow the unevennesses of the ground correctly.

The arm 33 of the support 12 includes a means 39 pressing the fourth bearing wheel 16 against the ground during windrowing work. This arm 33 is made in a first part 40 which is connected to the central spindle 11 and a second part 41 which carries said wheel 16. This second part 41 is articulated to the first part 40 by means of an axis 42 which is substantially horizontal and substantially perpendicular to the direction of travel A. A drawspring 43 is situated beneath the arm 33. It is hooked to its first part 40 and to its second part 41 in such a way that it pulls this second part 41 with the bearing wheel 16 downward and forward.

Figure 3:
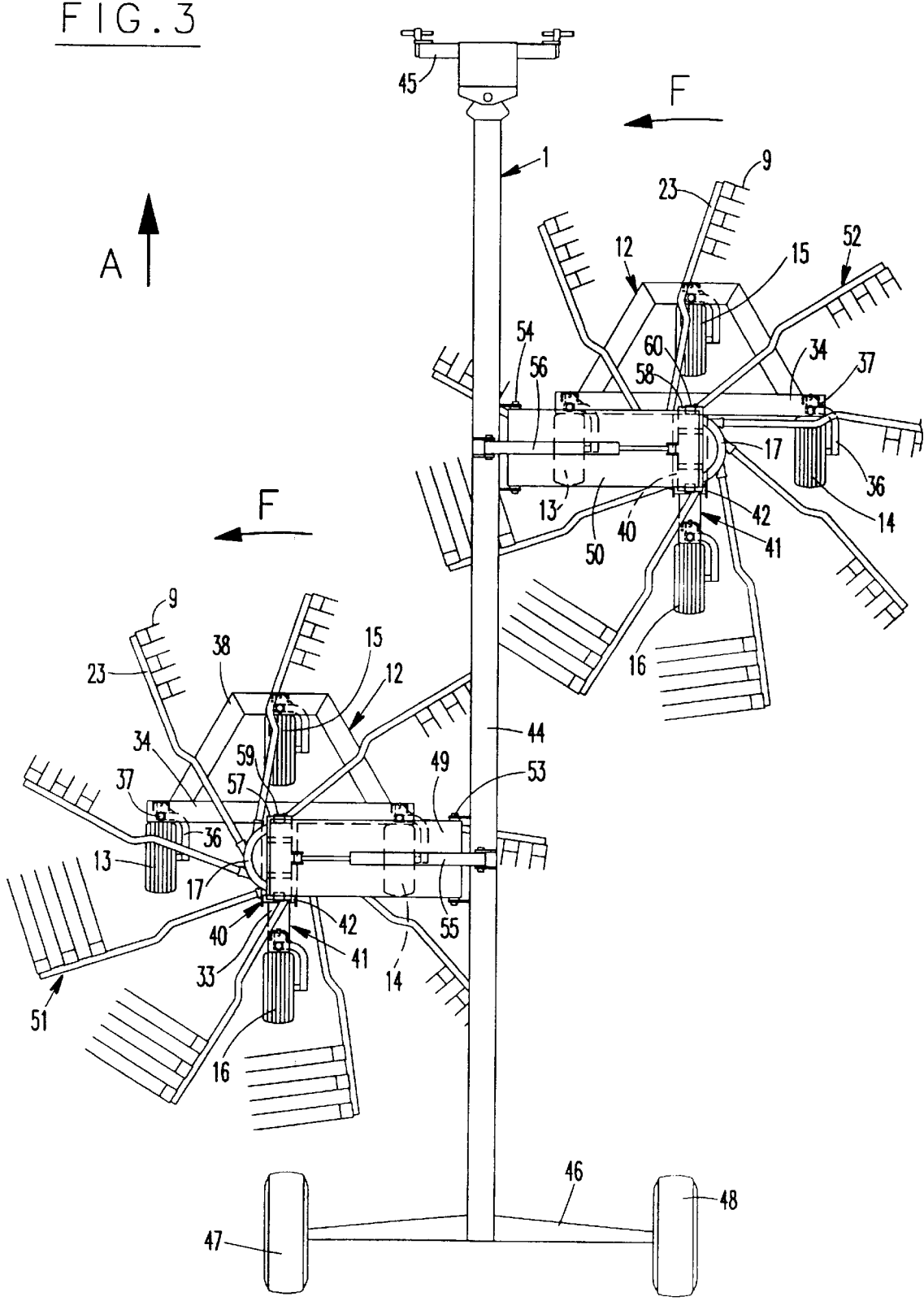
FIG. 3 represents a view from above of another embodiment of a machine according to the invention.

As is represented in the example according to FIGS. 3 and 4, the windrowing machine includes a bearing structure 1. This consists of a beam 44 which at its front end has a two-point coupling device 45 for hitching it to a driving tractor and at its rear end has a crossmember 46 with two displacement wheels 47 and 48 which rest on the ground. Said structure 1 in addition has two arms 49 and 50 each carrying a rotor 51, 52. Like the rotor 8 of the example according to FIGS. 1 and 2, each rotor 51, 52 includes a casing 10 with a central spindle 11. Mounted on this spindle 11 is a housing 17 with arms 23 fitted with tools 9 controlled by a cam. Fixed to its lower end is a support 12 with four bearing wheels 13 to 16 which can pivot about substantially vertical axes 37 of their cranked supports 36. These wheels are arranged beneath the corresponding rotor 51, 52 respectively to the left, to the right, in front of and behind its central spindle 11. The wheel 16 which is situated behind said spindle 11 is connected to an arm 33 of the support 12 which includes a means 39 pressing said bearing wheel 16 against the ground during work. This means 39 consists of a drawspring 43 which is hooked to a first stationary part 40 and to a second moving part 41 of the arm 33, this second part 41 being articulated to the first part 40 with an axis 42 which is substantially horizontal and perpendicular to the direction of travel A.

The arms 49 and 50 which carry the rotors 51 and 52 extend substantially at right angles to the beam 44 of the bearing structure 1, one on its left side and the other on its right side. They are offset with respect to each other, when considered in the direction of travel A. They may be telescopic so that the distance between the rotors 51 and 52 can be altered. Each of these arms 49 and 50 is articulated to the beam 44 by means of an axis 53, 54 which is substantially horizontal and points in the direction of travel A. In addition, a hydraulic jack 55, 56 is arranged between the beam 44 and each arm 49, 50. This jack allows the corresponding arm 49, 50 to be raised and lowered about its articulation axis 53, 54. The connection between each arm 49, 50 and its rotor 51, 52 is achieved via an intermediate piece 57, 58. This piece 57, 58 is articulated to the corresponding end of the arm 49, 50 by means of an axis 59, 60 which is substantially horizontal and points in the direction of travel A. This axis 59, 60 is therefore substantially parallel to the axis 53, 54 about which the arm 49, 50 is articulated to the beam 44. Said axis 59, 60 is situated practically above the central spindle 11 of the corresponding rotor 51, 52 so that the latter is practically balanced when it is raised by means of its arm 49, 50. Furthermore, each rotor 51, 52 is connected to the corresponding intermediate piece 57, 58 by means of two levers 61 and 62 which are substantially the same as the levers 27 and 28 described in conjunction with the example according to FIGS. 1 and 2. These levers 61 and 62 are articulated at one of their ends to the casing 10 of the rotor 51, 52 by means of axes 63 and 64 which are substantially horizontal and substantially perpendicular to the direction of travel A. At their other end they are articulated to the intermediate piece 57, 58 by means of axes 65 and 66 which are also substantially horizontal and substantially perpendicular to the direction of travel A. The two axes 65 and 66 about which the two levers 61 and 62 are articulated to the intermediate piece 57, 58 are further apart than the two axes 63 and 64 about which they are articulated to the casing 10. In this way these levers 61 and 62 converge downward. Straight lines D and D' passing through the two articulation axes 63, 65 and 64, 66 of each lever 61, 62 meet at a point P situated between the bearing wheels 13 to 16. Its distance from the ground may be more or less equal to half the height of said bearing wheels 13 to 16. Passing through this point P is an imaginary axis of pivoting of the corresponding rotor 51, 52 with respect to the arms 49 and 50 of the bearing structure 1. This imaginary axis of pivoting is substantially parallel to the articulation axes 63 to 66 of the levers 61 and 62. It is situated beneath the axis 59, 60 about which the corresponding intermediate piece 57, 58 is articulated to the carrier arm 49, 50.

During windrowing work, the machine according to FIGS. 1 and 2 is moved over the ground in the direction of travel A by means of a tractor. The housing 17 of the rotor 8 is therefore driven in rotation in the direction F about the substantially vertical spindle 11 from the tractor power take-off. The cam 24 controls the tool-carrying arms 23 via the rollers 26 and the levers 25, in such a way that in the front part of their path the tools 9 are substantially vertical and gather the product lying on the ground. Next, in the lateral part of their path, the tools 9 lift and deposit the gathered-up product in the form of a windrow. Finally, on the rear part of their path, these tools 9 return progressively to the position for gathering.

During this work, the wheels 13 to 16 run along the ground and carry the rotor 8. Thanks to their position beneath the rotor 8 they do not run over the product to be windrowed. They orientate themselves automatically during turns about the substantially vertical axes 37 of their cranked levers 36. When the bearing wheels 13 to 16 pass over unevennesses, they cause the rotor 8 to pivot, with respect to the beam 21 by means of the levers 27 and 28, about the imaginary axis which is situated at the intersection P of the straight lines D and D'. They thus cause the windrowing tools 9 to follow the unevennesses faithfully. The two wheels 13 and 14 situated laterally to the central spindle 11 may additionally cause the rotor 8 and the beam 2 to pivot about the axes 6 and 7 of the pivots 4 and 5 of the coupling device 3.

The rear bearing wheel 16 which is pulled downward by the spring 43 always stays in contact with the ground when passing over unevennesses. In this way it stabilizes the rotor 8. In addition, by means of the second part 41 of the arm 33, it exerts a pushing on the rotor 8 which tends to make it pivot forward about the imaginary axis which passes through the intersection P. The tools 9 which are situated in the front part of their path, that is to say in the part in which they gather up the product, are therefore kept close to the ground. This makes it possible to gather up all of the product.

During windrowing work, the windrowing machine represented in FIGS. 3 and 4 is hitched to a tractor which moves it in the direction A. The two arms 49 and 50 which carry the rotors 51 and 52 are lowered and their bearing wheels 13 to 16 run along the ground. The housings 17 of these rotors 51 and 52 are then driven in the same direction of rotation F from the tractor power take-off or by means of hydraulic motors. The tool-carrying arms 23 are controlled in such a way that their tools 9 gather up the product in the front part of their path and deposit it in the lateral part of their path. The tools 9 of the rotor 51 furthest back pick back up the product deposited by the rotor 52 which is furthest forward and form a large-volume lateral windrow.

The wheels 13 to 16 under each rotor 51 and 52 orientate themselves automatically about the substantially vertical axes 37 of their cranked levers 36 during turns. They do not run over the product to be windrowed. When they pass over unevennesses they cause the corresponding rotor 51, 52 to pivot via the levers 61 and 62 with respect to the arm 49, 50, about the imaginary axis which is situated at the intersection P of the straight lines D and D' and about the axes 59, 60 of the intermediate piece 57, 58. They thus make the windrowing tools 9 follow all the unevennesses.

The rear bearing wheel 16 of each rotor 51, 52 is pulled downward by the corresponding spring 43. It always stays in contact with the ground when passing over unevennesses and stabilizes the corresponding rotor 51, 52. In addition, it exerts a pushing force on said corresponding rotor 51, 52 which tends to make it pivot forward about the imaginary axis which is situated at the intersection P of the straight lines D and D'. The windrowing tools 9 which are situated in the front part of their path are therefore kept close to the ground. This makes it possible to improve the gathering-up of product lying on the ground.

It is quite clear that the invention is not limited to the embodiments described above and represented in the appended drawings. Modifications remain possible, especially as regards the construction or number of various elements or by substituting technical equivalents, without in any way departing from the field of protection.

I claim:

1. A haymaker machine, which comprises:
    a bearing structure which is connectable to a tractor;
    at least one rotor with windrowing tools which are controlled during operation, each said rotor being rotatable about a central spindle which is substantially vertical;
    a support which is fitted at a lower end of said central spindle and which is equipped with a plurality of bearing wheels;
    two levers articulated to the upper end of the rotor by first articulation axes which are substantially horizontal and perpendicular to a direction of travel of the machine, said levers being articulated to the bearing structure by second articulation axes which are substantially horizontal and perpendicular to the direction of travel of the machine;
    wherein the first and second axes of said two levers are located such that said levers converge in a downward direction and wherein straight lines passing through said first and second articulation axes intersect at a point of intersection situated between said bearing wheels.

2. The machine as claimed in claim 1, wherein the point of intersection of the straight lines passing through the articulation axes of the two levers is situated a distance from the ground which is substantially equal to one-half the height of the bearing wheels.

3. The machine as claimed in claim 1, wherein the bearing structure includes a pivot axis which is substantially horizontal and points in the direction of travel of the machine for each rotor.

4. The machine as claimed in claim 1, wherein the bearing structure comprises an arm carrying said rotor, said arm including a pivot axis which is substantially horizontal and points in the direction of travel of the machine.

5. The machine as claimed in claim 4, wherein an intermediate piece is articulated to said pivot axis, said rotor being connected to said intermediate piece by said levers.

6. The machine as claimed in claim 1, wherein at least one of said bearing wheels of each rotor is situated, as viewed in the direction of travel, behind said central spindle and is connected to an arm of the support which includes a mechanism pressing the bearing wheel situated behind the central spindle against the ground during windrowing work in such a way that said bearing wheel situated behind the central spindle constantly bears against the ground and tends to pivot the front half of each of the rotors downwards, about the articulation to the bearing structure.

7. The machine as claimed in claim 6, wherein said support having said plurality of bearing wheels includes a bearing wheel which is situated forward of the central spindle, a bearing wheel which is situated to a first side thereof and a bearing wheel which is situated to a second side thereof, as viewed in the direction of travel of the machine.

8. The machine as claimed in claim 6, wherein said arm of the bearing wheel which is situated behind the central spindle comprises a first part which is stationary and a second part which carries said wheel bearing which is situated behind the central spindle, said second part being articulated to the first part of a pin which is substantially horizontal and substantially perpendicular to the direction of travel of the machine.

9. The machine as claimed in claim 8, wherein said pressing mechanism includes a drawspring which is hooked to the said first part and to the said second part of the arm of the bearing wheel which is situated behind the central spindle, in such a way as to pull said second part with the bearing wheel downward and forward.

* * * * *